US 6,691,940 B2

(12) United States Patent
Katayama et al.

(10) Patent No.: US 6,691,940 B2
(45) Date of Patent: Feb. 17, 2004

(54) FISHING SPINNING REEL

(75) Inventors: Masatoshi Katayama, Tokyo (JP); Masashi Fujioka, Tokyo (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 10/197,415

(22) Filed: Jul. 18, 2002

(65) Prior Publication Data

US 2004/0011907 A1 Jan. 22, 2004

(51) Int. Cl.[7] ............................................. A01K 89/01
(52) U.S. Cl. ..................................................... 242/232
(58) Field of Search ................................. 242/231, 232

(56) References Cited

U.S. PATENT DOCUMENTS

| | | | | | |
|---|---|---|---|---|---|
| 4,337,905 | A | * | 7/1982 | Sazaki | 242/232 |
| 4,426,045 | A | * | 1/1984 | Gifford | 242/232 |
| 5,273,233 | A | * | 12/1993 | Sugawara | 242/232 |
| 5,312,067 | A | * | 5/1994 | Sugawara et al. | 242/232 |
| 5,683,049 | A | * | 11/1997 | Kawabe et al. | 242/232 |
| 5,904,309 | A | * | 5/1999 | Takeuchi | 242/243 |
| 6,050,511 | A | * | 4/2000 | Katayama et al. | 242/231 |
| 6,371,395 | B2 | * | 4/2002 | Sato | 242/232 |
| 6,382,542 | B1 | * | 5/2002 | Sato | 242/243 |

FOREIGN PATENT DOCUMENTS

| | | | | |
|---|---|---|---|---|
| EP | 0 467 812 A1 | * | 7/1991 | 242/232 |
| JP | 56-50273 | | 5/1981 | |
| JP | 5-3741 | * | 5/1993 | 242/232 |
| JP | 11-69931 | | 3/1999 | |

* cited by examiner

Primary Examiner—Emmanuel Marcelo
(74) Attorney, Agent, or Firm—Sughrue Mion, PLLC

(57) ABSTRACT

A fishing spinning reel comprises: a reel body; a rotor which is rotatably attached to the reel body, rotated in association with a rotation of a handle and includes a supporting arm; a bail supporting member including a bail and a fishing line guide portion, which is reversibly supported by the supporting arm and is adapted to be held in a fishing line-winding position and a fishing line-releasing position; a reversing member capable of moving in association with a reversing operation of the bail support member from the fishing line-winding position to the fishing line-releasing position; and a braking member elastically deformably held by the reversing member. When the bail support member is moved from the fishing line-winding position to the fishing line-releasing position, the braking member is brought into contact with a braking portion formed at the reel main body.

4 Claims, 8 Drawing Sheets

FISHING SPINNING REEL

BACKGROUND OF THE INVENTION

This invention relates to a fishing spinning reel which is capable of reversibly supporting a bail supporting member having a bail and a fishing line-guide portion onto a rotor rotating in association with a fishing line coiling operation of a handle under a fishing line-winding condition and under a fishing line-releasing condition.

The fishing spinning reel has a structure including a rotor and a spool. The rotor is rotated and the spool is moved back and forth in association with winding and rotating operations of the handle. The rotor is provided with a pair of supporting arms rotating around the spool. In front of the pair of support arms, the bail support members are reversibly supported by a switching-spring, and one-side bail support member is provided with a fishing line guide portion. These bail support members are attached with base portions of the bails for picking up the fishing line.

According to the fishing s pinning reel of the above mentioned structure, the bail (the bail support members) from the fishing line-winding position to the fishing line-releasing position by raising the bail, and under this condition, a fishing rod is forcibly brought down, so that a fishing tackle is thrown. Then, the fishing tackle land s on a water surface, if the bail (the, bail support members) is returned ( rotating the handle in the coiling direction, otherwise manually returning operation), the fishing line is picked up and moved to a fishing line guide portion and the operation is shifted to the fishing line-winding condition.

In the series of operations, owing to force when bringing down the fishing rod to release the fishing tackle, or influence of unnecessary rotation of the handle, it might happen that the bail support members held at the fishing line-releasing position of the support arms return by error to the fishing line-winding position by unnecessary rotation of the rotor, and the fishing line is broken together with the fishing tackle.

Therefore, as instruments for preventing the erroneous return caused by the unnecessary rotation of the rotor when releasing the fishing line, such fishing spinning reels incorporated with an erroneous return prevention apparatus have been proposed as disclosed in Japanese Utility Model Laid Open No. 50273/1981 (Known Example 1) or Japanese Patent Laid Open No. 69931/1999 (Known Example 2).

Known Example 1 discloses a structure of preventing the rotor from unnecessary rotation by contacting a braking member to a front part of a body, the braking member being secured to a front end of a kick-lever rotating in company with the bail being released and reversed from the fishing line-winding condition to the releasing condition. Further, Known Example 2 discloses a structure of preventing the rotor from unnecessary rotation by contacting the front end of the kick-lever to a ring-like elastic member (O-ring) attached to the front par t of the body, the kick-lever rotating in company with the bail being released and reversed from the fishing line-winding coiling condition to the releasing condition.

However, in the art disclosed in Known Example 1, since biasing force of a spring when releasing and reversing the bail is served as a brake holding force of the rotor, such serving amount makes heavy the returning and rotating operation of the rotor by rotating the handle from the fishing line-releasing condition to the coiling condition, so that the returning operation performance is worsened. At the same time, a bias holding state (a moderation holding force) is not stabilized in the fishing line-releasing position of the bail.

In the art disclosed in Known Example 2, since the biasing force of a switching-spring is utilized to impart the braking force to the rotor similarly to Known Example 1, the returning and rotating operation of the rotor by rotating the handle from the fishing line-releasing condition to the coiling condition is made heavy, so that the returning operation performance is worsened, and at the same time, a bias holding state (a moderation holding force) is not stabilized in the fishing line-releasing position of the bail. In addition, the ring-like elastic member (O-ring) attached in an extended state is easy to deteriorate, and sizes are easily made dispersed, so that the breaking braking performance and the endurance are worsened.

SUMMARY OF THE INVENTION

The invention has been realized on the basis of the above mentioned problems, and it is accordingly an object of the invention to provide a fishing spinning reel which has a good returning operational performance from the fishing line-releasing condition to the fishing line-winding condition, a stable bias holding force (the moderation holding force) in the fishing line-releasing position of the bail, and an incorporation of the erroneous return prevention apparatus of good breaking braking performance and endurance.

In order to solve the aforesaid object, the invention is characterized by having the following arrangement.

(1) A fishing spinning reel comprising:
   a reel body;
   a rotor which is rotatably attached to the reel body, rotated in association with a rotation of a handle and includes a supporting arm;
   a bail supporting member including a bail and a fishing line guide portion, which is reversibly supported by the supporting arm and is adapted to be held in a fishing line-winding position and a fishing line-releasing position;
   a reversing member capable of moving in association with a reversing operation of the bail support member from the fishing line-winding position to the fishing line-releasing position; and
   braking member elastically deformably held by the reversing member,
   wherein when the bail support member is moved from the fishing line-winding position to the fishing line-releasing position, the braking member is brought into contact with a braking portion formed at the reel main body.

(2) The fishing spinning reel according to (1), wherein the braking member is attached to the reversing member through a spring member.

(3) The fishing spinning reel according to (1), wherein a working member for pushing the reversing member when the bail spring member is moved from the fishing line-winding position to the fishing line-releasing position is rotatably held by the bail supporting member (4) The fishing spinning reel according to (1), wherein a projection is projected from the reel body so that when the bail supporting member is held in the fishing line-releasing position and the handle is rotated for winding a fishing line, the projection kicks the reversing member to move the reversing member in the fishing line-winding position.

(5) A fishing spinning reel comprising:
   a reel body;

a rotor which is rotatably attached to the reel body, rotated in association with a rotation of a handle and includes a supporting arm;

a bail supporting member including a bail and a fishing line guide portion, which is reversibly supported by the supporting arm and is adapted to be held in a fishing line-winding position and a fishing line-releasing position; and a reversing member capable of moving in association with a reversing operation of the bail support member from the fishing line-winding position to the fishing line-releasing position, wherein the reversing member is switched and held between both positions of a braking position for braking the rotor by contacting to a braking portion formed in the reel body and a non-braking position separate from the braking portion.

(6) The fishing spinning reel according to (5), wherein a projection is formed on one of the reversing member and the rotor, and a hole receiving the projection when the reversing member is in the braking position is formed through the other of the reversing member and the rotor.

BRIEF DESCRIPTION OF THE DRAWINGS

FIG. 12A is a view showing the structure of the reversing member, and FIG. 12B is a cross sectional view of the support structure of the reversing member; FIG. 13A is a view showing the structure of the reversing member, and FIG. 13B is a cross sectional view of the support structure of the reversing member.

DETAILED DESCRIPTION OF PREFERRED EMBODIMENTS

First Embodiment

Figure 1:
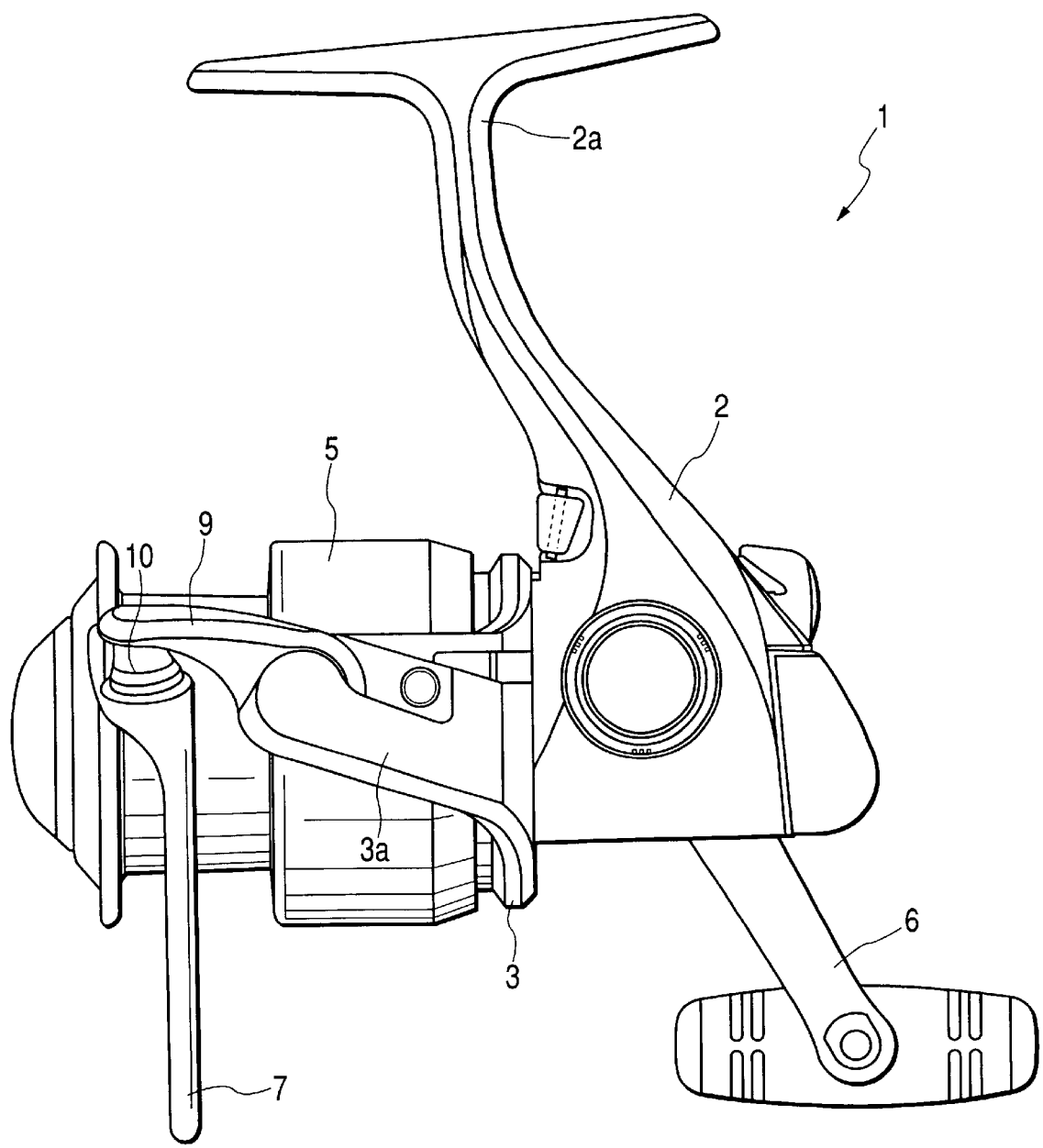
FIG. 1 is a side view showing one embodiment of the fishing spinning reel according to the invention.

FIG. 1 is a side view showing one embodiment of the fishing spinning reel according to the invention. At first, referring to FIG. 1, explanation will be made to a whole structure of the fishing spinning reel.

The fishing spinning reel 1 comprises a reel main body 2 formed with a fishing rod attaching portion 2a for attaching to the fishing rod, a rotor 3 rotatably attached to the front part of the reel main body, a spool 5 movably back and forth synchronously with rotation of the rotor 3, and a handle 6 rotatably supported by the reel main body 2 for rotating the rotor and moving back and forth the spool.

The rotor 3 is formed with a pair of support arms 3a, and at the respective front ends of the support arms 3a, the bail support members 9 (hereinafter referred to as "support member") to which the base parts of the bail 7 are attached are adapted to be held in the fishing line-winding position and the fishing line-releasing position. One base part of the bail 7 is attached to a fishing line guide portion 10 integrally formed to the support member 9.

With such a structure, when winding the handle 6, the rotor 3 is rotated and driven, the spool 5 is moved back and forth, and the fishing line is evenly wound on the spool 5 via the fishing line guide portion 10. The fishing line is released (casting the fishing tackle) by shifting the support member 9 (the bail 7) from the position of FIG. 1 to the fishing line-releasing position to make a state of getting out the fishing line from the fishing line guide portion 10 and bringing down the fishing rod.

Figure 2:
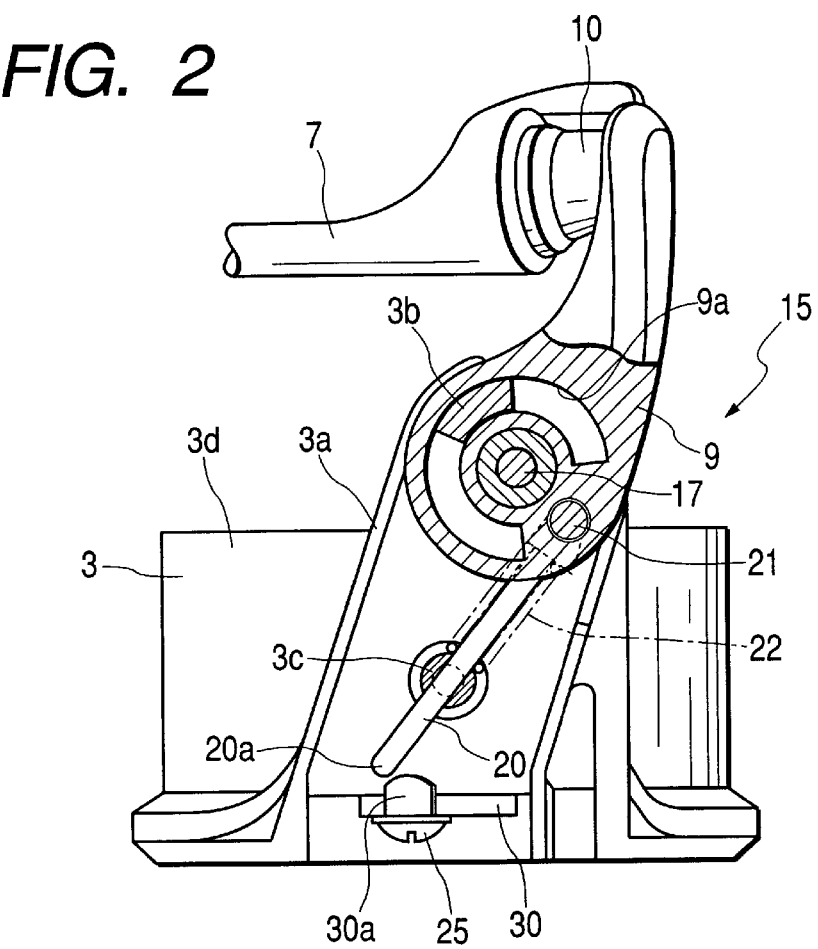
FIG. 2 is a view of an interior structure of the support arm of the rotor, showing the fishing line-winding position.
Figure 3:
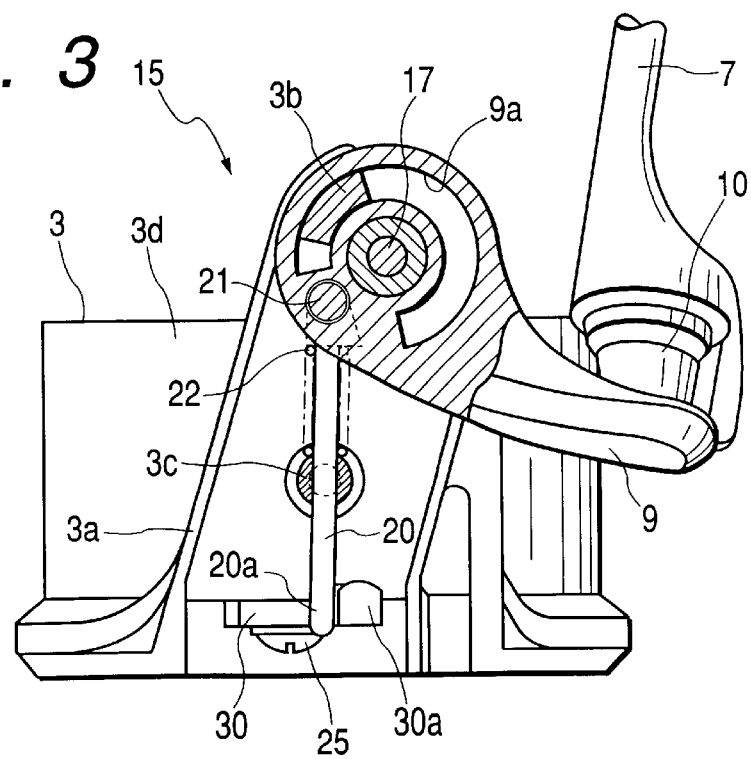
FIG. 3 is a view of an interior structure of the support arm of the rotor, showing the fishing line-releasing position.
Figure 4:
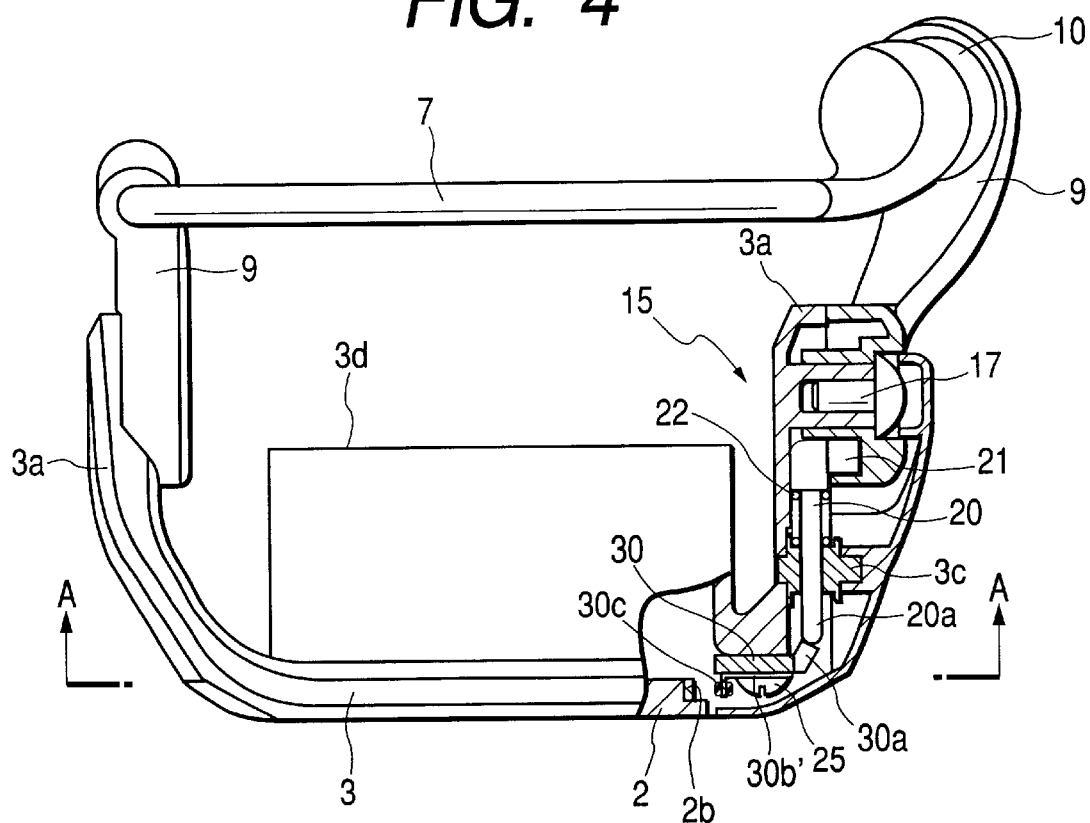
FIG. 4 is a view of a whole structure of the rotor and a partially cross sectional view of the support arm part, showing the fishing line-winding position.
Figure 5:
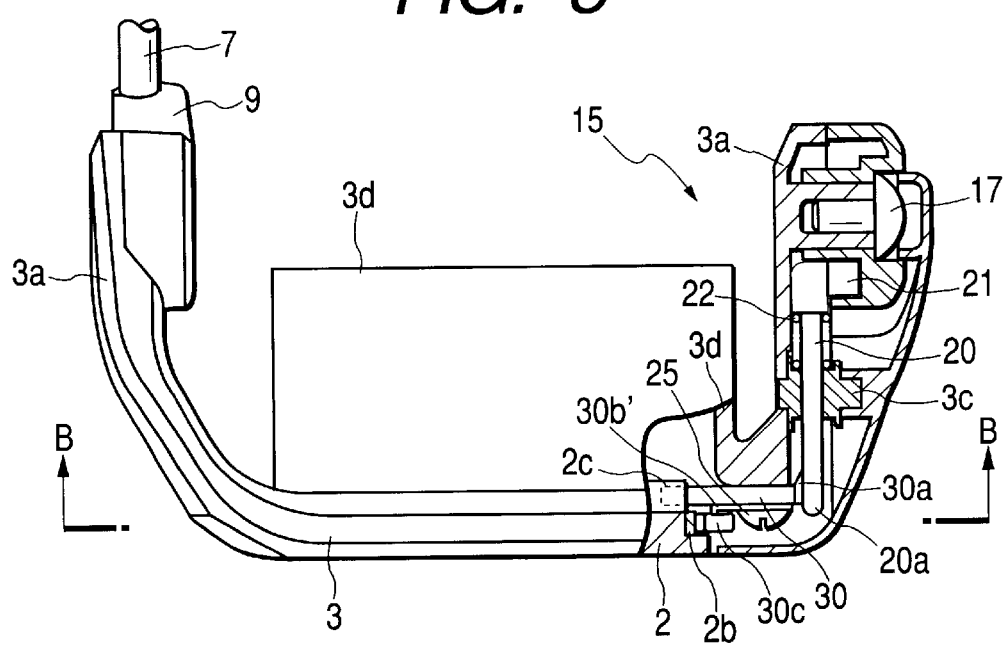
FIG. 5 is a view of a whole structure of the rotor and a partially cross sectional view of the support arm part, showing the fishing line-releasing position.
Figure 6:
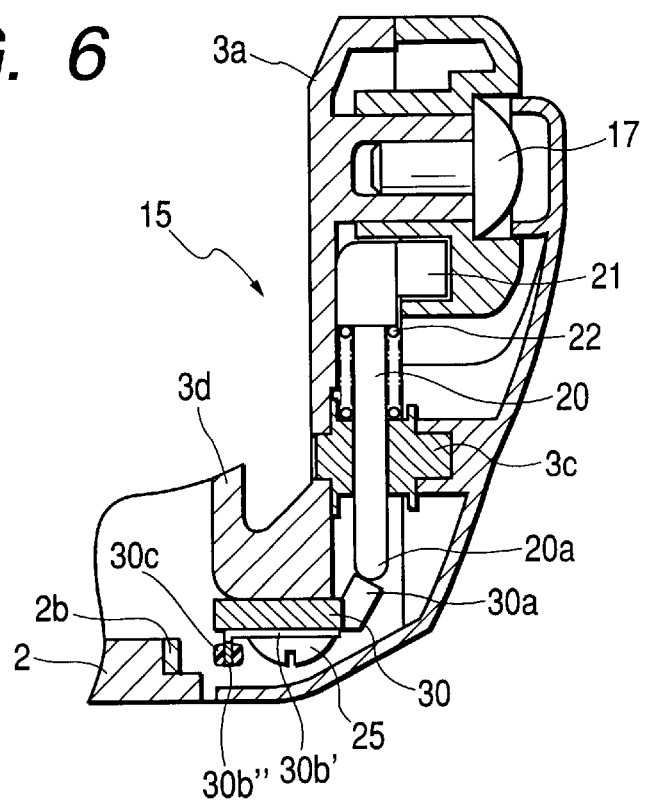
FIG. 6 is a view enlarging an elementary part of FIG. 4.
Figure 7:
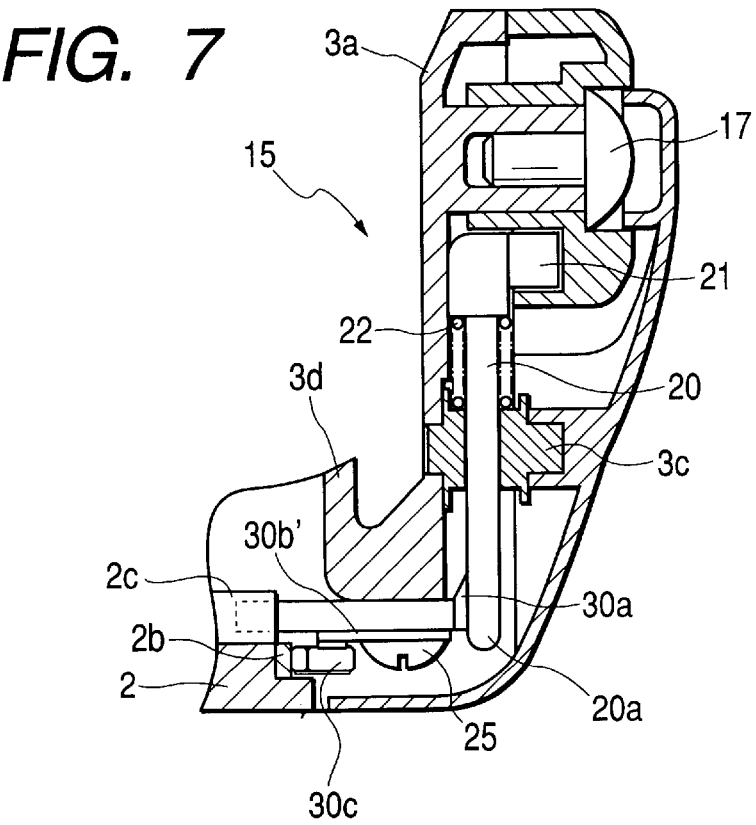
FIG. 7 is a view enlarging an elementary part of FIG. 5.
Figure 8:
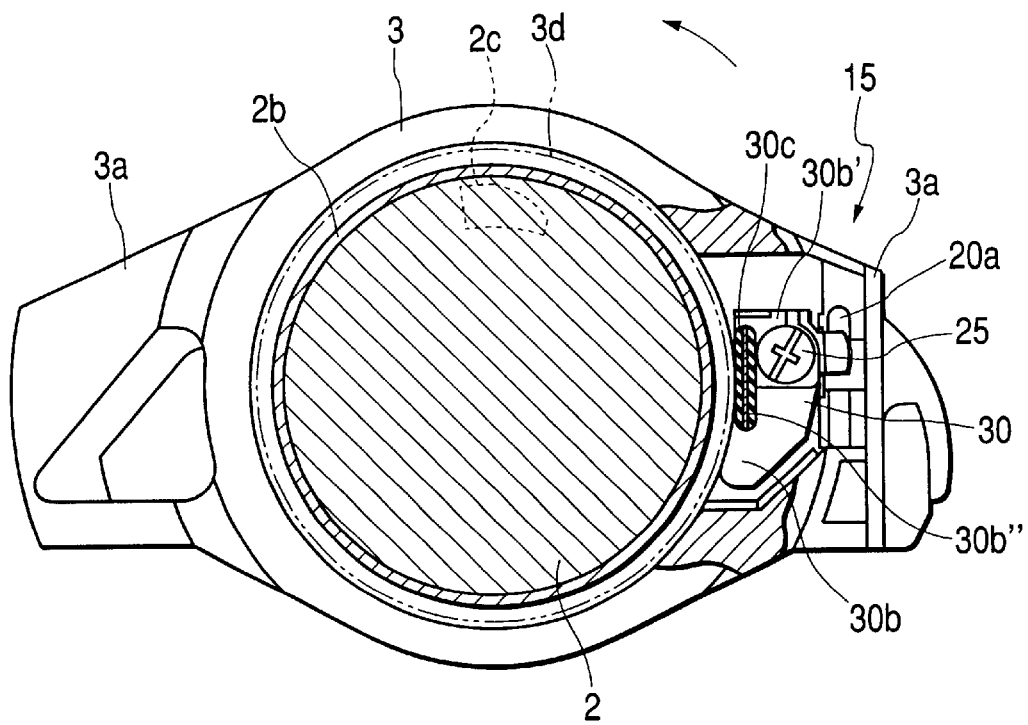
FIG. 8 is a plan view along A—A line of FIG. 4.
Figure 9:
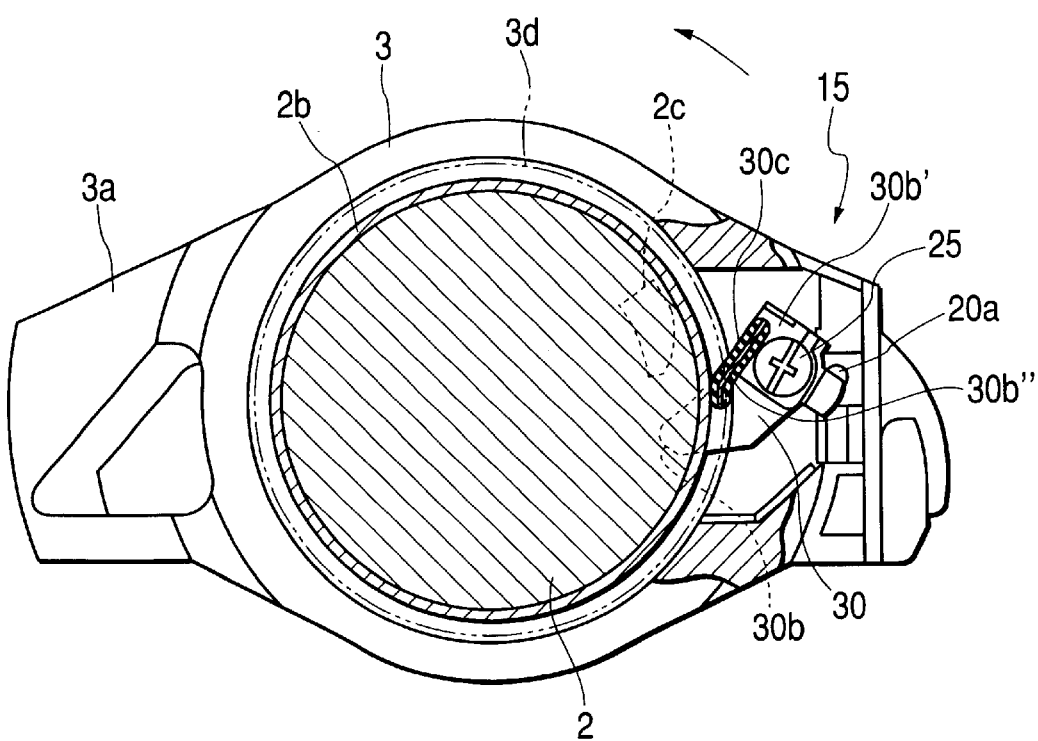
FIG. 9 is a plan view along B—B line of FIG. 5.

Next, explanation will be made, with reference to FIGS. 2 to 9, to structure and actuation of an erroneous return prevention apparatus for stabilizing the support arm 9 in the fishing line-releasing position when shifting the support member 9 for casting the fishing line. FIGS. 2 and 3 are views of an interior structure of the support arm of the rotor, showing the fishing line-winding position and the fishing line-releasing position, respectively. FIGS. 4 and 5 are views of a whole structure of the rotor and a partially cross sectional views of the support arm part, showing the fishing line-winding position and the fishing line-releasing position, respectively. FIGS. 6 and 7 are views enlarging the elementary parts of FIGS. 4 and 5. FIGS. 8 and 9 are plan views respectively along A—A line and B—B line of FIGS. 4 and 5.

The erroneous return prevention apparatus 15 is arranged in one of the support arms 3a of the rotor 3. In this embodiment, it is arranged within the support arm at the side furnished with the fishing line guide portion 10.

The support member 9 is rotatably supported within the support arm 3a by a pin 17, and structured so that the support member 9 is shifted to the fishing line-releasing position and the fishing line-winding position by a later mentioned switching-spring. Around the pin 17 of the support member 9, an arc like oblong hole 9a is formed. When the support member 9 is rotated, the oblong hole 9a is guided by a convex 3b projected in the support arm 3a.

The support arm 3a is provided almost at a center with a rotatable holding portion 3c. A bar like working member 20 is supported by the holding portion 3c and is rotatable as the holding portion 3c being a rotational axis. The bar like working member 20 in the center of the holding portion 3c is formed at one end side with a projection 21 being bent outside and held nearly a rotation supporting portion of the support member 9. The other side of the working member 20 extends toward the reel main body. When the support member 9 shifts from the fishing line-winding position to the fishing line-releasing position, a front end 20a thereof is engaged with the reversing member as mentioned herein after. Between the holding portion 3c and the projection 21, a coil shaped switching-spring 22 is arranged for shifting the support member 9 between the fishing line-winding position and the fishing line-releasing position.

As shown in FIGS. 4 and 5, the reversing member 30 is rotatably supported via a screw 25 by a connection portion defined between a cylindrical part 3d and the support arm 3a of the rotor 3 so that a plane of the reversing member 30 is substantially orthogonal to the rotational axis of the rotor. At the side part of the reversing member 30, an engaging projection 30a faces upward so that the reversing member 30 is positioned into an inside space of the support arm 3a, and a front end 20a of the working member 20 is engaged with the engaging projection 30a, the front end part 20a of the working member 20 being rotated in response to the reversing action of the support member 9 to the fishing line-releasing position (see FIGS. 2 and 3).

Incidentally, the reversing member 30 is furnished with a kick portion 30b, an elastic support plate 30b' and a braking member 30c. The kick portion 30b moves toward the center side of the rotor 3 when being rotated around the screw 25. The elastic support plate 30b' is integrally and fixedly attached to the surface of the reversing member 30 and is furnished with an elastically deformable side wall part 30b". The braking member 30c is urged to the outer periphery of the ring shaped breaking portion 2b fixedly fitted to the front part of the reel main body 2. In this case, the braking member 30c is, as shown in FIG. 8, formed like a plate extending in a tangent direction of the ring shaped breaking portion 2b so as to hold the elastic side wall 30b" of the elastic support plate 30b'. When the reversing member 30 is rotated, the braking member 30c is elastically deformed at its distal via the elastic side wall 30b" as shown in FIG. 9 and is urged to the outer periphery of the braking portion 2b.

The braking portion 2b may be formed directly at the front part of the reel main body 2, but it is preferable to form the braking portion 2b with another ring shaped member as shown in the illustrated embodiment, because the degree of freedom is increased without being restrained by a material of the reel main body 2 or a surface treatment. The braking portion 2b is, if needed, performed with the surface treatment in response to a resin, Al-alloy, Cu-alloy, Mg-alloy, or metals such as stainless steels. The braking member 30c is preferably formed with a rubber thread to be elastically deformed of itself, or others as a cork material of large frictional coefficient, and in case of being formed with an elastically deformable material, it may not be equipped at an elastically deformable part (the elastic side wall part).

As to the breaking braking member 30c, when the rotor 3 is rotated in the fishing line-winding direction (the arrow direction of FIGS. 8 and 9), the end portion opposite to the rotating direction contacts the breaking braking portion 2b under the elastically deformed condition, thereby make a good rotation of the rotor.

On the other hand, at the front part of the reel main body 2, when the rotor 3 is rotated in the fishing line-winding direction under a condition where the reversing member 30 is rotated and driven, a reversing projection 2c is projected toward the rotor side at a position where the kick part 30b can be contacted. The reversing projection 2c is formed with a taper for the reversing member 30 to smoothly move in semi-circle when the kick part 30c contacts.

Next, explanation will be made to the actuation of the erroneous return prevention apparatus in the above mentioned structure.

When the support member 9 rotates from the fishing line-winding position shown in FIG. 1 to the fishing line-releasing position, the oblong hole 9a rotates following the convex 3b as shown in FIGS. 2 and 3. According to this rotation, the working member 20 is rotated about the center of the holding portion 3c, and its front end portion 20a is engaged with the engaging projection 30a of the reversing member 30. The engaging projection 30a is pushed by the front end portion 20a of the working member 20, whereby the reversing member 30 is rotated around the screw 25.

When the reversing member 30 rotates, the braking member 30c provided therein is elastically deformed at its front end via the elastic side wall 30b" as shown in FIGS. 7 and 9, and is urged to the outer periphery of the ring-like braking portion 2b equipped at the front part of the reel main body. The rotor 3 is thereby regulated in rotation owing to frictional force between the braking member 30c and the outer periphery of the braking portion 2b. Accordingly, when releasing the fishing line, the unnecessary rotation to the rotor 3 is avoided, and the erroneous return of the support member 9 to the fishing line-winding position accompanied with the rotation of the rotor is exactly prevented.

Since the kick part 30b of the reversing member 30 enters toward the center of the rotor, when the handle is rotated after throwing the fishing tackle, the kick part 30b is kicked by the reversing projection 2c formed in the reel main body and returned to the position shown in FIG. 8. According to this action, the working member 20 is rotated from the state shown in FIG. 3 to the state shown in FIG. 2, and the support member 9 is returned to the fishing line-winding position at a point exceeding a dead point of the switching-spring 22.

According to the above mentioned erroneous return prevention apparatus, the reverse-holding force of the support member 9 to the fishing line-releasing position by the switching-spring 22 is independent, that is, not directly acting on the rotor braking force. Since the rotation of the reversing member 30 is not positioned by the switching-spring, the returning operation from the fishing line-releasing condition to the fishing line-winding condition by the operation of the handle is smoothly carried out. In addition, as the structure gives the braking force by urging the front end of the braking member 30c to the outer periphery of the ring-like braking portion 2b so that the front end of the braking member 30c is elastically deformed, positional changes to the breaking braking portion 2b owing to production errors or time-passing changes are prevented, and the moderation holding force at the fishing line-releasing position of the support member 9 is stabilized so that the erroneous return preventing effect is exactly available. Furthermore, since the braking member 30c is not structured to be ring-shaped, deterioration is less to occur and endurance is difficult to go down, and the braking performance can be stably maintained for a long term.

As far as the reversing member 30 is driven by such a member (part) not acted on by the direction holding force of the switching-spring 22 when the support member 9 is rotated to the fishing line-releasing position, various modifications are possible for the structure of the working member 20. Further, as far as the braking member 30c is structured to be urged to the outer periphery of the ring like braking portion 2b when the support member 9 is reversed to rotate the reversing member 30, various modifications are possible for shapes thereof.

Figure 10:
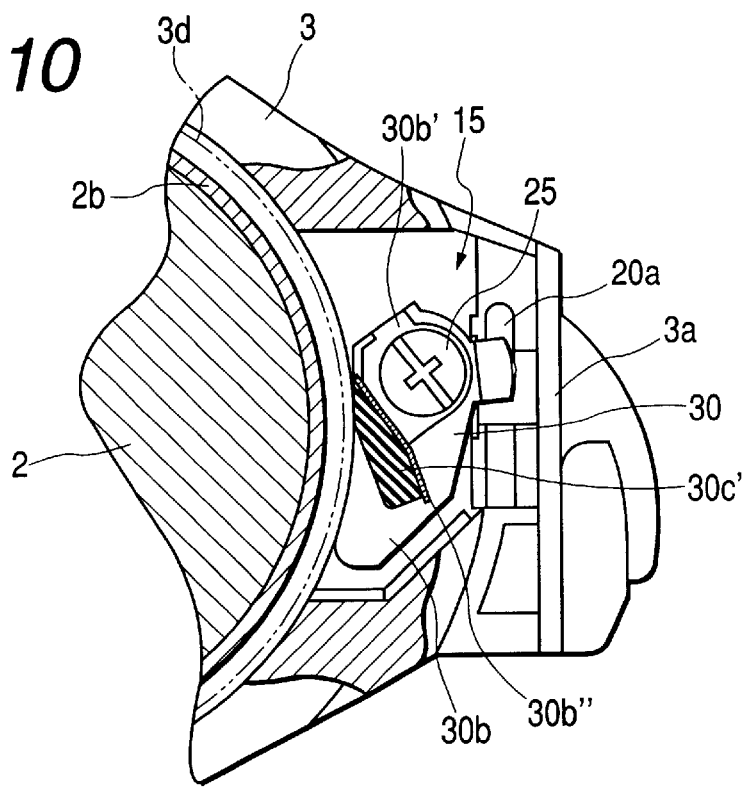
FIG. 10 is a view showing a modification of the braking member provided to the reversing member.
Figure 11:
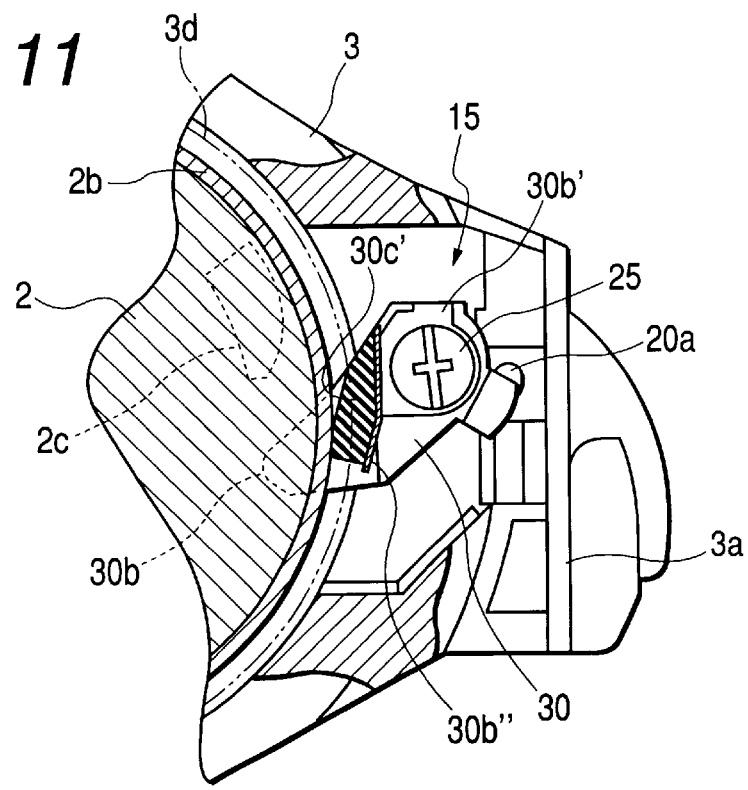
FIG. 11 is a view showing a state where the structure shown in FIG. 10 is imparting a braking force to the rotor.

Specifically, for example, as modified in FIGS. 10 and 11, appropriate deformations are possible in that the braking member 30c' is formed to be somewhat thick, which is attached to the side of the elastic side wall 30b" of the elastic support plate 30b' of the reversing member 30, and the inside of the front end of the braking member 30c' is formed to urge to the outer periphery of the braking portion 2b. According to these modifications, as the braking member 30c' is somewhat thick in the contacting direction, the braking force is heightened and the braking condition is made stable.

Second Embodiment

Figure 12A:
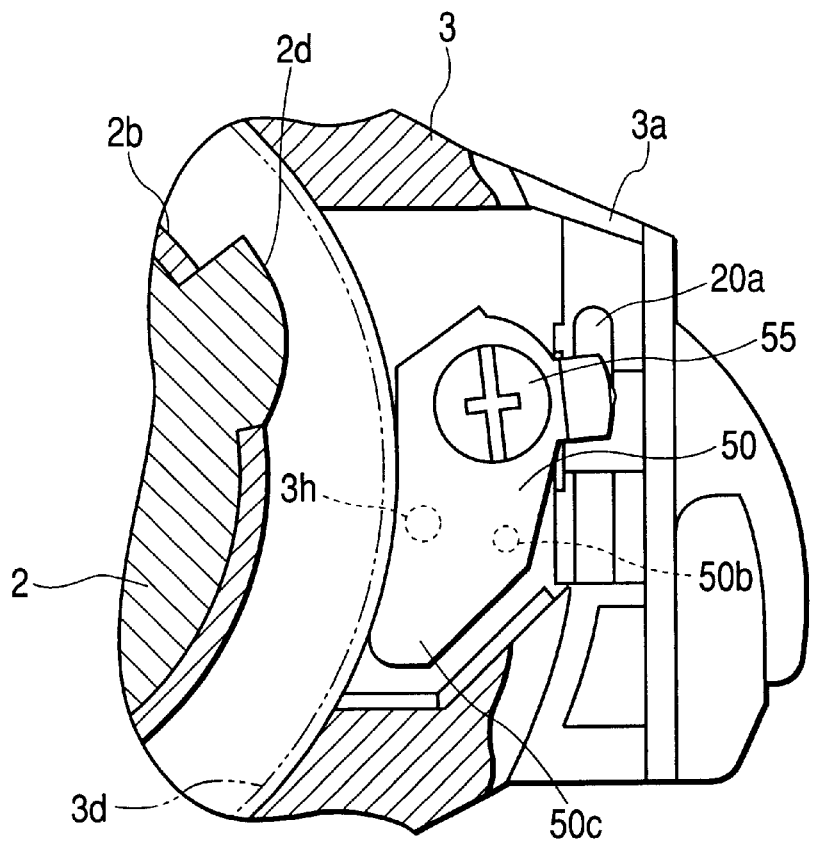
FIGS. 12A and 12B are views showing states where the braking force is not imparted to the rotor in the second embodiment.
Figure 12B:
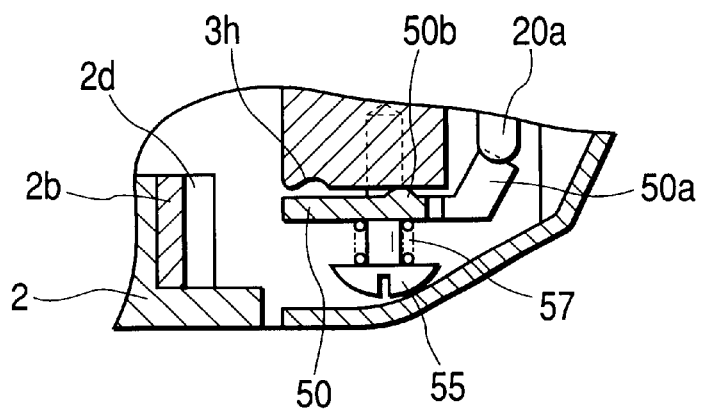
Figure 13A:
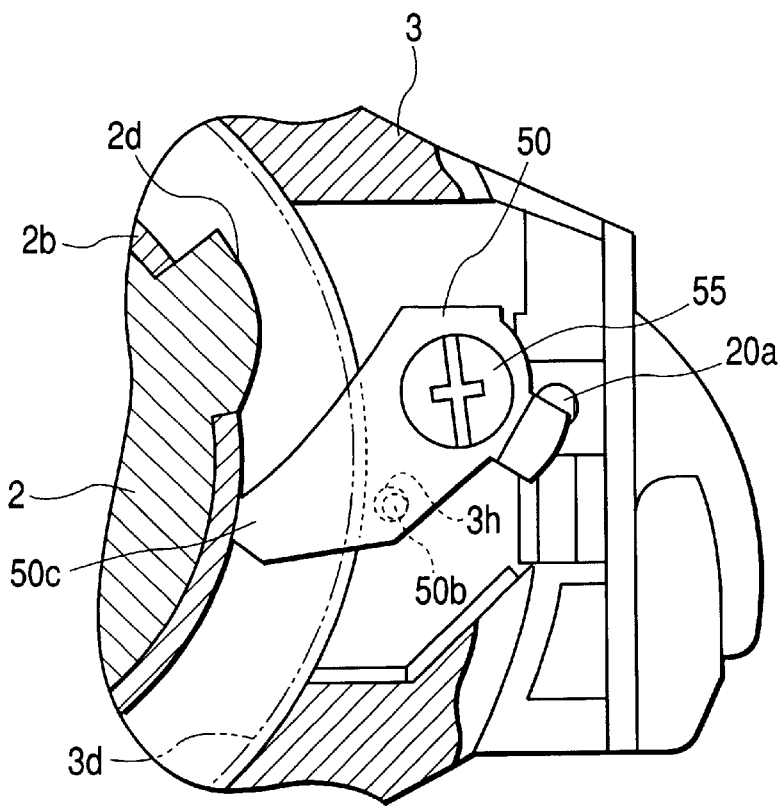
FIGS. 13A and 13B are views showing states where the braking force is imparted to the rotor in the structure shown in FIGS. 12A and 12B.
Figure 13B:
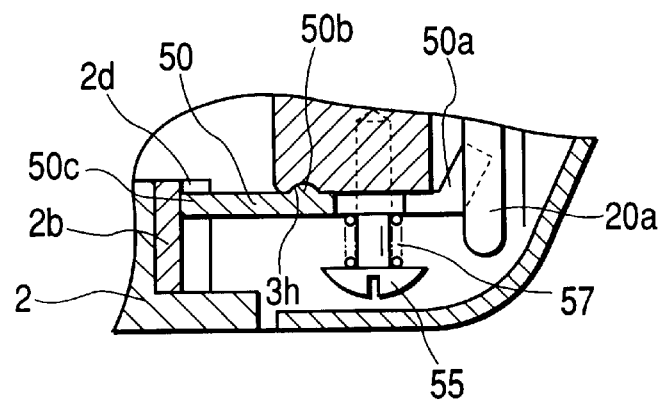

FIGS. 12 and 13 are views of a second embodiment of the invention showing the structure of the erroneous return prevention apparatus furnished to the fishing spinning reel. This embodiment shows the structure corresponding to that of FIGS. 8 and 9, and the same structural parts are given the same reference numerals.

With respect to the reversing member 50 according to this embodiment, similarly to the reversing member 30 according to the first embodiment, the reversing member 50 is rotatably supported via a screw 55 by a connection formed between the cylindrical part of the rotor and the support arm, so that a plane of the reversing member 50 is substantially orthogonal to the rotation axis of the rotor. At the side part of the reversing member 50, the engaging projection 50a faces upward so that the reversing member 50 is positioned into an inside space of the support arm of the rotor, and a front end 20a of the working member 20 engages the engaging projection 50a, the front end 20a of the working member 20 being rotated in response to the reversing action of the support member 9 shown in FIG. 2 to the fishing line-releasing position.

In the side surface of the spool side of the reversing member 50, a projection 50b is formed and extends toward the side of the connection. A hole 3h is formed for receiving the projection under the connection. Between the reversing member 50 and the head of the screw 55, a spring 57 is arranged to urge the reversing member 50 to the side of the connecting part.

When the reversing member 50 is rotated by the working member 20 as shown in FIG. 3, the projection 50b is received in the hole 3h in the positional relation where the front end of the kick portion 50c of the reversing member 50 contacts the ring like braking portion 2b.

That is, the reversing member 50 is switched between the braking and non-braking positions of the ring like braking portion 2b by the projection 50b, the hole 3h receiving it and the spring 57.

The braking portion 2b is formed with the reversing projection 2d projecting in the diameter direction. When the handle is operated to rotate the rotor, the kick part 50c of the reversing member 50 is contacted to the braking portion 2b so as to return the reversing member 50 to the non-braking position shown in FIG. 12. Accordingly, as to the projection 50b, the hole 3h receiving it and the spring 57, when the kick part 50c is contacted to the reversing projection 2d, the projection easily gets out from the hole 3h.

In the structure having the switching mechanism, the same working effect as in the above mentioned embodiment is obtained, and further, since it is unnecessary to furnish the braking member in the reversing member, no problem occurs in deterioration of the braking member. By the way, in this structure, the ring like braking portion 2b is appropriately treated as roughening materials of resins or rubber threads of large frictional force in relation with the kick part 50c, metal surfaces, or coating a paint to increase the frictional coefficient.

According to the structure of the invention, such a fishing spinning reel may be obtained which has the good returning operational performance from the fishing line-releasing state to the fishing line-winding state, the stable bias holding force (the moderation holding force) at the fishing line-releasing position of the bail, and an incorporation of the erroneous return prevention apparatus of good braking performance and endurance.

What is claimed is:

1. A fishing spinning reel comprising:
   a reel body;
   a rotor which is rotatably attached to the reel body, rotated in association with a rotation of a handle and includes a supporting arm;
   a bail supporting member including a bail and a fishing line guide portion, which is reversibly supported by the supporting arm and is adapted to be held in a fishing line-winding position and a fishing line-releasing position;
   a reversing member capable of moving in association with a reversing operation of the bail support member from the fishing line-winding position to the fishing line-releasing position; and
   a braking member elastically deformably held by the reversing member, wherein when the bail support member is moved from the fishing line-winding position to the fishing line-releasing position, the braking member is brought into contact with a braking portion formed at the reel main body.

2. The fishing spinning reel according to claim 1, wherein the braking member is attached to the reversing member through a spring member.

3. The fishing spinning reel according to claim 1, wherein a working member for pushing the reversing member when the bail spring member is moved from the fishing line-winding position to the fishing line-releasing position is rotatably held by the bail supporting member.

4. The fishing spinning reel according to claim 1, wherein a projection is projected from the reel body so that when the bail supporting member is held in the fishing line-releasing position and the handle is rotated for winding a fishing line, the projection kicks the reversing member to move the reversing member in the fishing line-winding position.

* * * * *